(12) United States Patent
Ambe et al.

(10) Patent No.: US 10,377,883 B2
(45) Date of Patent: Aug. 13, 2019

(54) RUBBER COMPOSITION FOR TIRE

(71) Applicants: UBE INDUSTRIES, LTD., Ube-shi, Yamaguchi (JP); SUMITOMO RUBBER INDUSTRIES, LTD., Kobe-shi, Hyogo (JP)

(72) Inventors: Mitsuharu Ambe, Ichihara (JP); Yuuto Kanou, Ichihara (JP); Takeshi Shoda, Ichihara (JP); Takahiro Mabuchi, Kobe (JP); Toshifumi Haba, Kobe (JP)

(73) Assignees: UBE INDUSTRIES, LTD., Ube-shi (JP); SUMITOMO RUBBER INDUSTRIES, LTD., Kobe-shi (JP)

( * ) Notice: Subject to any disclaimer, the term of this patent is extended or adjusted under 35 U.S.C. 154(b) by 203 days.

(21) Appl. No.: 15/128,406

(22) PCT Filed: Feb. 19, 2015

(86) PCT No.: PCT/JP2015/054522
§ 371 (c)(1),
(2) Date: Sep. 22, 2016

(87) PCT Pub. No.: WO2015/151626
PCT Pub. Date: Oct. 8, 2015

(65) Prior Publication Data
US 2017/0107358 A1 Apr. 20, 2017

(30) Foreign Application Priority Data

Mar. 31, 2014 (JP) .................. 2014-071193

(51) Int. Cl.
| | |
|---|---|
| C08L 9/06 | (2006.01) |
| B60C 1/00 | (2006.01) |
| C08F 36/06 | (2006.01) |
| C08L 7/00 | (2006.01) |
| C08L 9/00 | (2006.01) |
| C08F 4/70 | (2006.01) |

(52) U.S. Cl.
CPC .................... *C08L 9/06* (2013.01); *B60C 1/00* (2013.01); *C08F 36/06* (2013.01); *C08L 7/00* (2013.01); *C08L 9/00* (2013.01); *C08F 4/7096* (2013.01); *C08L 2205/02* (2013.01)

(58) Field of Classification Search
CPC ...... C08L 9/00; C08L 7/00; C08L 9/06; C08L 2205/02; C08F 36/06; C08F 4/7096; B60C 1/00
USPC ....................................................... 524/526
See application file for complete search history.

(56) References Cited

U.S. PATENT DOCUMENTS

| | | | |
|---|---|---|---|
| 2013/0338255 A1 | 12/2013 | Naka et al. | |
| 2014/0031482 A1 | 1/2014 | Wada | |

FOREIGN PATENT DOCUMENTS

| | | | |
|---|---|---|---|
| JP | 05-194658 | A | 8/1993 |
| JP | 10-298229 | A | 11/1998 |
| JP | 2004-211048 | A | 7/2004 |
| JP | 2004-263094 | A | 9/2004 |
| JP | 2004-339467 | A | 12/2004 |
| JP | 2005-008817 | A | 1/2005 |
| JP | 2005-036065 | A | 2/2005 |
| JP | 2005-154754 | A | 6/2005 |
| JP | 2005154754 | A * | 6/2005 |
| JP | 2006-063287 | A | 3/2006 |
| JP | 2006-241265 | A | 9/2006 |
| JP | 2010-163590 | A | 7/2010 |
| JP | 2011-079954 | A | 4/2011 |
| WO | 2007/081018 | A1 | 7/2007 |
| WO | 2008/041631 | A1 | 4/2008 |
| WO | 2012/073841 | A1 | 6/2012 |
| WO | 2012/144200 | A1 | 10/2012 |

OTHER PUBLICATIONS

JP 2005-154754A—machine translation (Year: 2005).*
Zeon Corporation, "Certificate of Experimental Result", total 3 pages.
Zeon Corporation, "Written Declartion", total 2 pages.
Ube Industries, Ltd., "Polybutadiene Rubber, Synthetic Rubber", total 7 pages.
ISA/JP, International Search Report dated Apr. 21, 2015 in International Application No. PCT/JP2015/054522, total 4 pages with translation.

* cited by examiner

*Primary Examiner* — Ronald Grinsted
(74) *Attorney, Agent, or Firm* — Masuvalley & Partners

(57) ABSTRACT

The present invention provides a rubber composition for a tire having improved workability and abrasion resistance. A rubber composition for a tire according to the present invention comprises: a polybutadiene which has: (A) a Mooney viscosity ($ML_{1+4, 100° C.}$) being 43 or more; (B) a ratio ($Tcp/ML_{1+4, 100° C.}$) of 5 wt % toluene solution viscosity (Tcp) to Mooney viscosity ($ML_{1+4, 100° C.}$) being 0.9 to 2.3; (C) a stress relaxation time (T80) being 10.0 to 40.0 seconds, which is a time until a torque is attenuated by 80% when the torque at the end of $ML_{1+4, 100° C.}$ measurement is 100%; and (D) a molecular weight distribution (Mw/Mn) being 2.50 to 4.00; another rubber (ii); and a rubber reinforcing material (iii).

16 Claims, No Drawings

RUBBER COMPOSITION FOR TIRE

RELATED APPLICATIONS

The present invention is the U.S. National Phase of and claims priority to International Patent Application No. PCT/JP2015/054522 filed Feb. 19, 2015 entitled RUBBER COMPOSITION FOR TIRES, which claims priority to Japanese Patent Application Number JP 2014-071193 filed Mar. 31, 2014; all of which are incorporated herein by reference in their entireties.

TECHNICAL FIELD

The present invention relates to a rubber composition for a tire which contains a polybutadiene having improved workability and abrasion resistance, which can be used for tire members such as treads, side walls, and chafers.

BACKGROUND ART

Generally, polybutadienes are superior to the other rubbers in abrasion resistance, but are inferior in workability. Since the abrasion resistance and the workability have a trade-off relation with each other, if one is improved, the other is deteriorated in performance. Thus, various improvements have been accomplished until now.

For example, a polybutadiene composition for a tire is reported, in which the abrasion resistance and the workability are balanced by defining a ratio (Tcp/ML) of 5% toluene solution viscosity (Tcp) to Mooney viscosity (ML) of the polybutadiene synthesized by using a cobalt catalyst (Patent Document 1).

Moreover, the abrasion resistance and the workability are tried to be further balanced by defining a Mooney viscosity speed-dependent index (n level) in addition to defining the ratio (Tcp/ML) of 5% toluene solution viscosity (Tcp) to Mooney viscosity (ML) of the polybutadiene synthesized by using a cobalt catalyst (Patent Documents 2 and 3).

PRIOR ART DOCUMENT

Patent Document

Patent Document 1: JP 2004-339467 A

Patent Document 2: JP 2004-211048 A

Patent Document 3: WO 2007/081018

SUMMARY OF THE INVENTION

Problem to be Solved by the Invention

However, in the market, a rubber composition for a tire having more highly balanced workability and abrasion resistance is required.

Thus, an object of the present invention is to provide a rubber composition for a tire having improved workability and abrasion resistance.

Means of Solving the Problem

A rubber composition for a tire according to the present invention comprises:
a polybutadiene (i) which has:
(A) a Mooney viscosity ($ML_{1+4,100°C.}$) being 43 or more;
(B) a ratio ($Tcp/ML_{1+4,100°C.}$) of 5 wt % toluene solution viscosity (Tcp) to Mooney viscosity ($ML_{1+4,100°C.}$) being 0.9 to 2.3;
(C) a stress relaxation time (T80) being 10.0 to 40.0 seconds, which is a time until a torque is attenuated by 80% when the torque at the end of $ML_{1+4,100°C.}$ measurement is 100%; and
(D) a molecular weight distribution (Mw/Mn) being 2.50 to 4.00;
another rubber (ii); and
a rubber reinforcing material (iii).

In a rubber composition for a tire according to the present invention, 1 to 100 parts by weight of the rubber reinforcing material (iii) is preferably compounded with respect to 100 parts by weight of the rubber component (i)+(ii) which consists of 5 to 90 parts by weight of the polybutadiene (i) and 95 to 10 parts by weight of the other rubber (ii).

In a rubber composition for a tire according to the present invention, the polybutadiene (i) preferably further has:
(E) a weight average molecular weight (Mw) being $40.0 \times 10^4$ to $75.0 \times 10^4$, and
(F) a ratio of cis-structure in microstructural analysis being 98 mol % or less.

In a rubber composition for a tire according to the present invention, the polybutadiene (i) is preferably produced by using a cobalt catalyst.

A rubber composition for a tire according to the present invention preferably comprises a styrene butadiene rubber as the other rubber (ii). Also, a rubber composition for a tire according to the present invention preferably comprises a natural rubber or an isoprene rubber as the other rubber (ii). Note that, both of these may be satisfied.

Effect of the Invention

According to the present invention, a rubber composition for a tire having improved workability and abrasion resistance can be provided.

MODE FOR CARRYING OUT THE INVENTION (Polybutadiene)

A polybutadiene used in the present invention has the following properties.

(A) The Mooney viscosity ($ML_{1+4,100°C.}$) is 43 or more. In the polybutadiene used in the present invention, the Mooney viscosity ($ML_{1+4,100°C.}$) is preferably 45 to 74, is more preferably 48 to 70, and is further preferably 50 to 65. When the $ML_{1+4,100°C.}$ is 43 or more, the abrasion resistance is more improved. On the other hand, when the $ML_{1+4,100°C.}$ is 74 or less, the workability is more improved. Note that, the Mooney viscosity ($ML_{1+4,100°C.}$) is measured by a method described in EXAMPLE mentioned below.

(B) The ratio ($Tcp/ML_{1+4,100°C.}$) of 5 wt % toluene solution viscosity (Tcp) to Mooney viscosity ($ML_{1+4,100°C.}$) is 0.9 to 2.3. $Tcp/ML_{1+4,100°C.}$ is preferably 1.2 to 1.9, and is more preferably from 1.4 to 1.7. $Tcp/ML_{1+4,100°C.}$ provides an indication of the branching degree. In a case where the $Tcp/ML_{1+4,100°C.}$ is less than 0.9, the branching degree is too high whereby the abrasion resistance is reduced. On the other hand, in a case where the $Tcp/ML_{1+4,100°C.}$ is more than 2.3, the branching degree is too low whereby the cold flow is easy to occur and the preservation stability of the product is decreased. Note that, the 5 wt % toluene solution viscosity (Tcp) and the Mooney viscosity ($ML_{1+4,100°\ C.}$) are measured by a method described in EXAMPLE mentioned below.

(C) The stress relaxation time (T80) is 10.0 to 40.0 seconds, which is a time until a torque is attenuated by 80% when the torque at the end of $ML_{1+4,100°\ C.}$ measurement is 100%. The T80 is preferably 11.0 to 26.0 seconds, and is more preferably 12.0 to 20.0 seconds. When the T80 is less than 10.0 seconds, filler dispersion state of is hard to be good because there is little entanglement of rubber molecules and the retentivity of the shear stress is insufficient. On the other hand, when the T80 is more than 40.0 seconds, the dimension stability is inferior and the workability is deteriorated because the residual stress in the molding process is increased. Note that, the stress relaxation time (T80) is measured by a method described in EXAMPLE mentioned below. The change of the stress relaxation of a rubber is depended on a combination of the elastic ingredient with the viscosity ingredient, and slow stress relaxation shows much elastic ingredient while fast tress relaxation shows much viscosity ingredient.

(D) The molecular weight distribution (Mw/Mn) is 2.50 to 4.00. The Mw/Mn is preferably 2.60 to 3.60, and is more preferably 2.70 to 3.20. When the Mw/Mn is less than 2.50, the workability is deteriorated. On the other hand, when the Mw/Mn is more than 4.00, the abrasion resistance is deteriorated. Note that, the number average molecular weight (Mn), the weight average molecular weight (Mw) and the molecular weight distribution (Mw/Mn) are measured by a method described in EXAMPLE mentioned below.

Further, in a polybutadiene used in the present invention, (E) the weight average molecular weight (Mw) is preferably $40.0 \times 10^4$ to $75.0 \times 10^4$, is more preferably $46.0 \times 10^4$ to $65.0 \times 10^4$, and is further preferably $52.0 \times 10^4$ to $62.0 \times 10^4$. When the Mw is $40.0 \times 10^4$ or more, the abrasion resistance is more improved. On the other hand, when the Mw is $75.0 \times 10^4$ or less, the workability is more improved.

Further, in a polybutadiene used in the present invention, (F) the ratio of cis-structure in microstructural analysis is preferably 98 mol % or less, is more preferably 94.0 to 97.8 mol %, and is further preferably 95.0 to 97.6 mol %. When the ratio of cis-structure in microstructural analysis is 98 mol % or less, sufficient branched polymer chains are provided and a stress relaxation time to be required is easily obtained. However, when the ratio of cis-structure in microstructural analysis is too small, the abrasion resistance tends to be deteriorated. Note that, the ratio of the microstructure is measured by a method described in EXAMPLE mentioned below.

In a polybutadiene according to the present invention, the toluene solution viscosity (Tcp) is preferably 42 to 160, is more preferably 55 to 135, and is further preferably 68 to 120. When the Tcp is 42 or more, the abrasion resistance is more improved. On the other hand, when the Tcp is 160 or less, the workability is more improved.

In a polybutadiene used in the present invention, the number average molecular weight (Mn) is preferably $12.5 \times 10^4$ to $30.0 \times 10^4$, is more preferably $16.0 \times 10^4$ to $23.0 \times 10^4$, and is further preferably $17.0 \times 10^4$ to $20.3 \times 10^4$. When the Mn is $12.5 \times 10^4$ or more, the abrasion resistance is more improved. On the other hand, when the Mn is $30.0 \times 10^4$ or less, the workability is more improved.

In a polybutadiene used in the present invention, the ratio of vinyl-structure in microstructural analysis is preferably 2 mol % or less, and is more preferably 1.8 mol % or less. When the ratio of vinyl-structure in microstructural analysis is 2 mol % or less, the molecular mobility is good and the tan 6 in dynamic viscoelasticity property after the vulcanization is good. Note that, the ratio of vinyl-structure in microstructural analysis is preferably as low as possible, but the ratio may be 1.0 mol % or more, for example.

In a polybutadiene used in the present invention, the ratio of trans-structure in microstructural analysis is preferably 2.0 mol % or less, is more preferably 1.6 mol % or less, and is further preferably 1.3 mol % or less. When the ratio of trans-structure in microstructural analysis is 2.0 mol % or less, the abrasion resistance is more improved. Note that, the ratio of trans-structure in microstructural analysis is preferably as low as possible, but the ratio may be 1.0 mol % or more, for example.

In a polybutadiene used in the present invention, the polybutadiene may be denatured with a sulfur compound such as disulfur dichloride and monosulfur monochloride, an organic peroxide or t-butyl chloride, and the polybutadiene needs not be denatured.

(Method for Producing Polybutadiene)

A polybutadiene used in the present invention can be produced by using a catalyst system including a transition metal catalyst, an organic aluminum compound and water.

As the transition metal catalyst, a cobalt catalyst is preferable. Examples of the cobalt catalyst include: cobalt salts such as cobalt chloride, cobalt bromide, cobalt nitrate, cobalt octylate (ethyl hexanoate), cobalt naphthenate, cobalt acetate, and cobalt malonate; cobalt bis-acetylacetonate, cobalt tris-acetylacetonate, acetoacetic acid ethyl ester cobalt, and organic base complexes or ethyl alcohol complexes of cobalt salts such as pyridine complexes and picoline complexes. Among these, cobalt octylate (ethyl hexanoate) is preferable. Note that, if a polybutadiene having the above-mentioned properties is provided, another catalyst such as a neodymium catalyst or a nickel catalyst can be used.

The amount of the transition metal catalyst used can be adjusted appropriately to be a polybutadiene having a desired Mooney viscosity.

Examples of the organic aluminum compound include: trialkylaluminums; halogen containing organic aluminum compounds such as dialkylaluminum chlorides, dialkylaluminum bromides, alkylaluminum sesquichlorides, alkylaluminum sesquibromides, alkylaluminum dichlorides, and alkylaluminum dibromides; and hydrogenated organic aluminum compounds such as dialkylaluminum hydrides and alkylaluminum sesquihydrites. The organic aluminum compound may be used alone, or may be used in combination with two or more.

Specific examples of the trialkylaluminum include trimethylaluminum, triethylaluminum, triisobutylaluminum, trihexylaluminum, trioctylaluminum, and tridecylaluminum.

Examples of the dialkylaluminum chloride include dimethylaluminum chloride and diethylaluminium chloride. Examples of the dialkylaluminum bromide include dimethylaluminum bromide and diethylaluminium bromide. Examples of the alkylaluminum sesquichloride include methylaluminum sesquichloride and ethylaluminum sesquichloride. Examples of the alkylaluminum sesquibromide include methylaluminum sesquibromide and ethylaluminum sesquibromide. Examples of the alkylaluminum dichloride include methylaluminum dichloride, ethylaluminum dichloride. Examples of the alkylaluminum dibromide include methylaluminum dibromide and ethylaluminum dibromide.

Examples of the dialkylaluminum hydride include diethylaluminium hydride and diisobutylaluminum hydride. Examples of the alkylaluminum sesquihydrite include ethylaluminum sesquihydride and isobutylaluminum sesquihydride.

As for the mixture ratio of the organic aluminum compound and water, the aluminum/water (mole ratio) is preferably 1.5 to 3 and is more preferably 1.7 to 2.5 because a polybutadiene having a desired T80 is easily obtained.

Further, in order to be a polybutadiene having a desired Mooney viscosity, a molecular weight modifier can be used. Examples thereof include: non-conjugated dienes such as cyclooctadiene, allene, and methylallene (1,2-butadiene); and $\alpha$-olefins such as ethylene, propylene and 1-butene. The molecular weight modifier may be used alone, or may be used in combination with two or more.

The polymerization method is not particularly limited, and a mass polymerization (bulk polymerization) for polymerizing a monomer in a condition where a diene compound monomer such as 1,3-butadiene is used as a polymerization solvent, and a solution polymerization for polymerizing a monomer in a condition where the monomer is soluble in a solvent can be applied. Examples of the solvent used for the solution polymerization include: aromatic-type hydrocarbons such as toluene, benzene, and xylene; saturated aliphatic hydrocarbons such as n-hexane, butane, heptane, and pentane; alicyclic hydrocarbons such as cyclopentane and cyclohexane; olefin-type hydrocarbons such as cis-2-butene and trans-2-butene; petroleum-type solvents such as mineral spirits, solvent naphtha and kerosene; and halogenated hydrocarbons such as methylene chloride. Among these, toluene, cyclohexane, or a mixed solvent of cis-2-butene and trans-2-butene is preferably used.

The polymerization temperature is preferably in a range of −30 to 150° C., is more preferably in a range of 30 to 100° C., and is further preferably in a range of 70 to 80° C. because a polybutadiene having a desired T80 is easily obtained. The polymerization time is preferably in a range of 1 minute to 12 hours, and is more preferably in a range of 5 minutes to 5 hours.

After the polymerization reaction reaches a predetermined polymerization rate, an antioxidant can be added as needed. Examples of the antioxidant include: phenol-type antioxidants such as 2,6-di-tert-butyl-p-cresol (BHT); phosphorus-type antioxidants such as trinonyl phenyl phosphite (TNP); and sulfur-type antioxidants such as 4,6-bis(octyl thiomethyl)-o-cresol and dilauryle-3,3'-thiodipropionate (TPL). The antioxidant may be used alone, or may be used in combination with two or more. The amount of the antioxidant added is preferably 0.001 to 5 parts by weight with respect to 100 parts by weight of the polybutadiene.

After polymerization for a predetermined time, the pressure inside the polymerization tank is discharged as needed, and a postprocess such as washing or drying step is further performed, by which a polybutadiene having desired properties can be produced.

(Rubber Composition for Tire)

A Rubber composition for a tire according to the present invention contains an above-mentioned polybutadiene (i), another rubber (ii), and a rubber reinforcing material (iii).

As the other rubber component (ii), for example, a diene rubber except the polybutadiene having the above-mentioned properties can be used. Examples of the diene rubber except the polybutadiene having the above-mentioned properties include: polymers of a diene monomer such as polybutadiene rubbers which do not have the above-mentioned properties, nature rubbers, high-cis polybutadiene rubbers, low-cis polybutadiene rubbers (BR), syndiotactic-1,2-polybutadiene containing butadiene rubbers (VCR), isoprene rubbers, butyl rubbers, and chloroprene rubber; acrylonitrile-diene copolymerization rubbers such as acrylonitrile butadiene rubbers (NBR), nitrile chloroprene rubbers, and nitrile isoprene rubbers; styrene-diene copolymerization rubbers such as emulsion polymerized or solution polymerized styrene butadiene rubbers (SBR), styrene chloroprene rubbers, and styrene isoprene rubbers; and ethylene propylene diene rubbers (EPDM). Among these, butadiene rubbers which do not have the above-mentioned properties, natural rubbers, syndiotactic-1,2-polybutadiene containing butadiene rubbers, isoprene rubbers, acrylonitrile butadiene rubbers, and styrene butadiene rubbers are preferable. Particularly, solution polymerized styrene butadiene rubbers (s-SBR), natural rubbers and isoprene rubbers are preferred. The other rubber component (ii) may be used alone, or may be used in combination with two or more.

Examples of the rubber reinforcing material (iii) include: inorganic reinforcing materials such as carbon blacks, white carbons (silicas), activated calcium carbonates, and ultrafine particle magnesium silicates; organic reinforcing materials such as polyethylene resins, polypropylene resins, high styrene resins, phenolic resins, lignin, denaturated melamine resins, coumarone indene resins, and petroleum resins. Among these, carbon black or silica is preferable. The rubber reinforcing material may be used alone, or may be used in combination with two or more.

Examples of the carbon black include FEF, FF, GPF, SAF, ISAF, SRF, and HAF. Among these, ISAF having a small particle diameter is preferable from the viewpoint of improving the abrasion resistance. The average particle diameter of the carbon black is preferably 15 nm or more and 90 nm or less. The dibutyl phthalate (DBP) oil absorption of the carbon black is preferably 70 ml/100 g or more and 140 ml/100 g or less. Examples of the silica include Nipsil VN3 (trade name, made by Tosoh Silica Corporation) and Ultrasil 7000GR (trade name, made by Evonik Degussa Co., Ltd.).

Regarding the compounding ratio of the above-mentioned components, the amount of the rubber reinforcing material (iii) is preferably 1 to 100 parts by weight with respect to 100 parts by weight of the rubber component (i)+(ii) which consists of 5 to 90 parts by weight of the polybutadiene (i) and 95 to 10 parts by weight of the other rubber (ii). The rubber component (i)+(ii) more preferably consists of 10 to 60 parts by weight of the polybutadiene (i) and 90 to 40 parts by weight of the other rubber (ii), and further preferably consists of 20 to 40 parts by weight of the polybutadiene (i) and 80 to 60 parts by weight of the other rubber (ii). The amount of the rubber reinforcing material (iii) is more preferably 30 to 90 parts by weight and is further preferably 50 to 80 parts by weight, with respect to 100 parts by weight of the rubber component (i)+(ii).

The rubber composition for a tire can be obtained by kneading the above-mentioned components with a Banbury, an open roll, a kneader, and a biaxial kneader, as usually performed.

The rubber composition for a tire may be obtained by kneading a compounding agent which is typically used in the rubber industry, such as a silane coupling agent, a vulcanizing agent, a vulcanized accelerant, an antioxidant, a filler, a process oil, zinc oxide, or stearic acid as needed.

As the silane coupling agent, a silane coupling agent having a functional group, which can be reacted with the above-mentioned polybutadiene (i) or the other rubber component (ii), is preferable. The silane coupling agent may be used alone, or may be used in combination with two or more.

As the vulcanizing agent, a known vulcanizing agent, e.g. a metal oxide such as sulfur, an organic peroxide, a resin vulcanizing agent, or magnesium oxide can be used. The vulcanizing agent may be used alone, or may be used in combination with two or more.

As the vulcanized accelerant, a known vulcanized assistant, e.g. an aldehyde, an ammonia, an amine, a guanidine, a thiourea, a thiazole, a thiuram, a dithiocarbamate, or a xanthan can be used. The vulcanized accelerant may be used alone, or may be used in combination with two or more.

Examples of the antioxidant include amine ketone-type antioxidants, imidazole-type antioxidants, amine-type antioxidants, phenol-type antioxidants, sulfur-type antioxidants, and phosphorus-type antioxidants. The antioxidant may be used alone, or may be used in combination with two or more.

Examples of the filler include: inorganic fillers such as calcium carbonates, basic magnesium carbonates, clays, litharges, and diatomaceous earths; organic fillers such as reproduction rubbers and powdery rubbers. The filler may be used alone, or may be used in combination with two or more.

As the process oil, any one of aromatic-type process oils, naphthenic-type process oils, and paraffin-type process oils may be used. Also, a low-molecular-weight liquid polybutadiene or a tackifier may be used. The process oil may be used alone, or may be used in combination with two or more.

EXAMPLE

Examples according to the present invention are described below.

(5 wt % Toluene Solution Viscosity (Tcp))

The 5 wt % toluene solution viscosities (Tcp) of polybutadienes were measured by using a Cannon-Fenske viscometer No. 400 at 25° C. after dissolving 2.28 g of the polymer in 50 ml of toluene. Note that, standard liquids for calibrating viscometers (JIS Z8809) were used for standard solution.

(Mooney Viscosity ($ML_{1+4, 100° C.}$))

The Mooney viscosities ($ML_{1+4, 100° C.}$) of polybutadienes or compounded substances were measured at 100° C. according to JIS-K6300. Note that, regarding the $ML_{1+4, 100° C.}$ of a compounded substance, the indexes obtained by assuming the value of Comparative Example 1 or Comparative Example 5 to 100 were calculated. When the index is larger, the $ML_{1+4, 100° C.}$ of the compounded substance becomes smaller and the workability is improved.

(Stress Relaxation Time (T80))

The stress relaxation times (T80) of polybutadienes and compounded substances were calculated by the stress relaxation measurement according to ASTM D1646-7. Specifically, the torque (0 second) at the time when the rotor stopped after the measurement for four minutes under the condition for measuring the $ML_{1+4, 100° C.}$ assumed to be 100%, and the time (unit: second) until the value was relaxed by 80% (i.e. attenuated to 20%) was measured as the stress relaxation times (T80).

(Number Average Molecular Weight (Mn), Weight Average Molecular Weight (Mw), Molecular Weight Distribution (Mw/Mn))

The number average molecular weights (Mn), the weight average molecular weights (Mw) and the molecular weight distributions (Mw/Mn) of the polybutadienes were calculated by GPC method (made by Tosoh Corporation, trade name: HLC-8220) using standard polystyrenes. Tetrahydrofuran was used for the solvent, two serially-connected columns KF-805L (trade name) made by Shodex were used, and a differential refractometer (RI) was used for the detector.

(Microstructure)

The microstructures of the polybutadienes were calculated by infrared absorption spectrum analysis. Specifically, microstructures of the polymers were calculated from the absorption strength ratio of the peak positions which derived from the microstructure (cis: 740 $cm^{-1}$, vinyl: 910 $cm^{-1}$, trans: 967 $cm^{-1}$)

(Abrasion Resistance)

As the index of the abrasion resistances of the rubber compositions, Lambourn abrasion coefficients according to JIS-K6264 were measured at a slip rate of 20%, and the indexes obtained by assuming the value of Comparative Example 1 or Comparative Example 5 to 100 were calculated. When the index is larger, the Lambourn abrasion coefficient becomes larger and the abrasion resistance is improved.

Example 1

To a 1.5 L stainless-steel reactor with a stirrer which was nitrogen-substituted, 1.0 L of a polymerization solution (butadiene (BD): 34.2 wt %, cyclohexane (CH): 31.2 wt %, and the rest was 2-butene) was loaded. Further, 1.52 mmol of water ($H_2O$), 2.08 mmol of diethylaluminium chloride (DEAC), 0.52 mmol of triethylaluminum (TEA) (all aluminum/water=1.71 (mixed mole ratio)), 20.94 µmol cobalt octoate ($Co_{cat}$), and 6.05 mmol of cyclooctadiene (COD) were added, and the mixture obtained was stirred at 72° C. for 20 minutes to perform 1,4-cis-polymerization. Then, ethanol containing 4,6-bis(octyl thiomethyl)-o-cresol was added to stop the polymerization. Unreacted butadiene and 2-butene were evaporated and removed to obtain a polybutadiene. The properties thereof are shown in TABLE 1.

Then, a rubber composition containing a styrene butadiene rubber (SBR) was produced by using the polybutadiene obtained. Specifically, at first, 30 parts by weight of the polybutadiene and 70 parts by weight of a styrene butadiene rubber (SBR) were mixed for 30 seconds by using a Labo plastmil (made by Toyo Seiki Seisaku-sho, Ltd., trade name: BR-250) in which the temperature and the rotation number were set to be 90° C. and 68 rpm, respectively. Then, 32.5 parts by weight of a silica (made by Evonik Degussa Co., Ltd., trade name: Ultrasil 7000GR) which was half quantity of the defined amount and 5.2 parts by weight of a silane coupling agent (made by Evonik Degussa Co., Ltd., trade name: si75) were mixed. Sequentially, 32.5 parts by weight of the rest silica, 25 parts by weight of an oil (made by H&R Group, trade name: VivaTec 400), and 3 parts by weight of ZnO (Sakai Chemical Industry Co., Ltd., trade name: Sazex 1), 1 part by weight of stearic acid (made by Asahi Denka Co., Ltd., trade name: ADEKA fatty acid SA-300), and 1 part by weight of AO (antioxidant, made by Ouchi Shinko Industrial, trade name: Nocrac 6C) were loaded and the mixture obtained was kneaded for six minutes in total.

Then, after cooling or cooling in air the kneaded material obtained, the re-mil was performed again by a 6-inch roll. Further, 1.7 parts by weight of a first vulcanization accelerator (made by Ouchi Shinko Industrial, trade name: Nocceler CZ (CBS)), 2 parts by weight of a second vulcanization accelerator (made by Ouchi Shinko Industrial, trade name: Nocceler D (DPG)), and 1.4 parts by weight of a vulcanizing agent (powdered sulfur, Tsurumi Chemical Industry Co., Ltd.) were mixed with the kneaded material by a 6-inch roll to produce a compounded substance. The physical property (Mooney viscosity) of the compounded substance is shown in TABLE 1.

The compounded substance obtained was put in a mold and was press-vulcanized to produce a rubber composition. Note that, the vulcanizing time was 2 times as long as a vulcanizing characteristic t90 at 160° C. which was calculated by viscoelastic measuring device (made by Alpha Technologies, trade name: RPA2000). The physical property (Lambourn abrasion coefficient) of the rubber composition obtained is shown in TABLE 1.

Comparative Example 1

Operations were performed in the same manner as in Example 1 except that a commercial polybutadiene (made by UBE INDUSTRIES, LTD., trade name: BR150L) was used. The results are shown in TABLE 1.

Comparative Example 2

Operations were performed in the same manner as in Example 1 except that a commercial polybutadiene (made

TABLE 1

|  | Ex. | | | | | | | | | Comp. Ex. | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| Mooney viscosity $ML_{1+4, 100° C.}$ | 50 | 51 | 61 | 63 | 70 | 74 | 50 | 54 | 64 | 42 | 42 | 67 | 44 |
| 5 wt % toluene solution viscosity Tcp [cps] | 70 | 74 | 103 | 117 | 135 | 150 | 51 | 55 | 86 | 101 | 48 | 197 | 127 |
| branching degree Tcp/$ML_{1+4, 100° C.}$ | 1.4 | 1.5 | 1.7 | 1.9 | 1.9 | 2.0 | 1.0 | 1.0 | 1.4 | 2.4 | 1.2 | 2.9 | 2.9 |
| stress relaxation time T80 [s] | 13.4 | 12.5 | 16.4 | 12.0 | 13.6 | 14.0 | 20.4 | 25.4 | 22.5 | 3.2 | 16.3 | 4.7 | 3.5 |
| number average molecular weight Mn [×$10^4$] | 17.4 | 18.0 | 19.1 | 19.9 | 20.3 | 21.8 | 16.3 | 16.6 | 18.4 | 21.1 | 15.9 | 25.8 | 18.4 |
| weight average molecular weight Mw [×$10^4$] | 52.1 | 56.3 | 56.8 | 62.3 | 61.8 | 64.0 | 53.8 | 59.0 | 64.8 | 49.8 | 46.4 | 63.6 | 57.4 |
| molecular weight distribution Mw/Mn | 2.99 | 3.13 | 2.97 | 3.13 | 3.04 | 2.93 | 3.29 | 3.56 | 3.52 | 2.36 | 2.91 | 2.46 | 3.12 |
| microstructure cis [mol %] | 97.3 | 97.6 | 97.5 | 97.3 | 97.5 | 97.6 | 96.7 | 96.9 | 97.2 | 98.1 | 97.4 | 98.1 | 97.8 |
| microstructure vinyl [mol %] | 1.4 | 1.2 | 1.3 | 1.4 | 1.2 | 1.2 | 1.7 | 1.6 | 1.5 | 0.9 | 1.4 | 0.8 | 1.1 |
| microstructure trans [mol %] | 1.3 | 1.2 | 1.2 | 1.3 | 1.2 | 1.2 | 1.6 | 1.5 | 1.3 | 1.0 | 1.2 | 1.1 | 1.2 |
| Mooney viscosity of compounded substance $ML_{1+4, 100° C.}$ [INDEX] | 103 | 104 | 98 | 102 | 96 | 95 | 111 | 112 | 104 | 100 | 106 | 91 | 107 |
| Lambourn abrasion coefficient of rubber composition [INDEX] | 103 | 105 | 106 | 107 | 113 | 113 | 92 | 105 | 110 | 100 | 90 | 102 | 99 |

Examples 2 to 9

Operations were performed in the same manner as in Example 1 except that the compounding ratio of raw materials and the polymerization temperature were changed to those shown in TABLE 2. The results are shown in TABLE 1. Note that, in Examples 7 and 8, triethylaluminum (TEA) was not used.

by UBE INDUSTRIES, LTD., trade name: BR150B) was used. The results are shown in TABLE 1.

Comparative Example 3

Operations were performed in the same manner as in Example 1 except that a preproduction polybutadiene was used. The results are shown in TABLE 1.

TABLE 2

|  | Ex. | | | | | | | | |
| --- | --- | --- | --- | --- | --- | --- | --- | --- | --- |
|  | 1 | 2 | 3 | 4 | 5 | 6 | 7 | 8 | 9 |
| BD concentration [wt %] | 34.2 | 34.2 | 34.2 | 34.2 | 34.2 | 34.2 | 35.0 | 35.0 | 37.0 |
| CH concentration [wt %] | 31.2 | 31.2 | 31.2 | 31.2 | 31.2 | 31.2 | 28.0 | 28.0 | 27.2 |
| $H_2O$ [mmol] | 1.52 | 1.52 | 1.52 | 1.52 | 1.52 | 1.52 | 0.94 | 0.94 | 1.41 |
| DEAC [mmol] | 2.08 | 2.08 | 2.08 | 2.08 | 2.08 | 2.08 | 1.90 | 1.90 | 2.21 |
| TEA [mmol] | 0.52 | 0.52 | 0.52 | 0.52 | 0.52 | 0.52 | — | — | 0.20 |
| Al/$H_2O$ | 1.71 | 1.71 | 1.71 | 1.71 | 1.71 | 1.71 | 2.02 | 2.02 | 1.71 |
| $Co_{cat}$ [µmol] | 20.94 | 13.83 | 17.40 | 12.47 | 13.83 | 12.47 | 23.00 | 23.00 | 14.44 |
| COD [mmol] | 6.05 | 8.40 | 5.50 | 7.60 | 4.70 | 5.20 | 7.10 | 6.70 | 7.71 |
| polymerization temperature [° C.] | 70 | 70 | 70 | 70 | 70 | 70 | 72 | 72 | 73 |

Comparative Example 4

Operations were performed in the same manner as in Example 1 except that a commercial polybutadiene (made by UBE INDUSTRIES, LTD., trade name: BR710) was used. The results are shown in TABLE 1.

Example 10

A rubber composition containing a natural rubber was produced by using the polybutadiene obtained in Example 1.

Specifically, at first, 50 parts by weight of the polybutadiene and 50 parts by weight of a natural rubber (RSS#1; $ML_{1+4,100°C.}$ was adjusted to 70) were mixed for 60 seconds by using a Labo plastmil (made by Toyo Seiki Seisaku-sho, Ltd., trade name: BR-250) in which the temperature and the rotation number were set to be 90° C. and 68 rpm, respectively. Then, 50 parts by weight of a carbon black (ISAF), 3 parts by weight of an oil (made by H&R Group, trade name: VivaTec 400), and 3 parts by weight of ZnO (Sakai Chemical Industry Co., Ltd., trade name: Sazex 1), 2 parts by weight of stearic acid (made by Asahi Denka Co., Ltd., trade name: ADEKA fatty acid SA-300), and 2 parts by weight of AO (antioxidant, made by Sumitomo Chemical, trade name: antigen 6C) were loaded and the mixture obtained was kneaded for four minutes in total.

Then, 1 part by weight of a vulcanization accelerator (made by Ouchi Shinko Industrial, trade name: Nocceler NS) and 1.5 parts by weight of a vulcanizing agent (powdered sulfur, Tsurumi Chemical Industry Co., Ltd.) were mixed with the kneaded material obtained by a 6-inch roll to produce a compounded substance. The physical property (Mooney viscosity) of the compounded substance is shown in TABLE 3.

The compounded substance obtained was put in a mold and was press-vulcanized to produce a rubber composition. Note that, the vulcanizing time was 2 times as long as a vulcanizing characteristic t90 at 150° C. which was calculated by viscoelastic measuring device (made by Alpha Technologies, trade name: RPA2000). The physical property (Lambourn abrasion coefficient) of the rubber composition obtained is shown in TABLE 3.

TABLE 3

|  | Ex. | | | | | Comp. Ex. | | |
| --- | --- | --- | --- | --- | --- | --- | --- | --- |
|  | 10 | 11 | 12 | 13 | 14 | 5 | 6 | 7 |
| Mooney viscosity $ML_{1+4, 100°C.}$ | 50 | 61 | 50 | 54 | 64 | 42 | 42 | 44 |
| 5 wt % toluene solution viscosity Tcp [cps] | 70 | 103 | 51 | 55 | 86 | 101 | 48 | 127 |
| branching degree $Tcp/ML_{1+4, 100°C.}$ | 1.4 | 1.7 | 1.0 | 1.0 | 1.4 | 2.4 | 1.2 | 2.9 |
| stress relaxation time T80 [s] | 13.4 | 16.4 | 20.4 | 25.4 | 22.5 | 3.2 | 16.3 | 3.5 |
| number average molecular weight Mn [×10⁴] | 17.4 | 19.1 | 16.3 | 16.6 | 18.4 | 21.1 | 15.9 | 18.4 |
| weight average molecular weight Mw [×10⁴] | 52.1 | 56.8 | 53.8 | 59.0 | 64.8 | 49.8 | 46.4 | 57.4 |
| molecular weight distribution Mw/Mn | 2.99 | 2.97 | 3.29 | 3.56 | 3.52 | 2.36 | 2.91 | 3.12 |
| microstructure cis [mol %] | 97.3 | 97.5 | 96.7 | 96.9 | 97.2 | 98.1 | 97.4 | 97.8 |
| microstructure vinyl [mol %] | 1.4 | 1.3 | 1.7 | 1.6 | 1.5 | 0.9 | 1.4 | 1.1 |
| microstructure trans [mol %] | 1.3 | 1.2 | 1.6 | 1.5 | 1.3 | 1.0 | 1.2 | 1.2 |
| Mooney viscosity of compounded substance $ML_{1+4, 100°C.}$ [INDEX] | 103 | 95 | 109 | 108 | 97 | 100 | 113 | 93 |
| Lambourn abrasion coefficient of rubber composition [INDEX] | 105 | 104 | 94 | 99 | 100 | 100 | 90 | 97 |

Examples 11 to 14

Operations were performed in the same manner as in Example 10 except that the polybutadiene obtained in Examples 3 and 7 to 9 were used. The results are shown in TABLE 3.

Comparative Examples 5 to 7

Operations were performed in the same manner as in Example 10 except that the polybutadiene obtained in Comparative Examples 1, 2 and 4 were used. The results are shown in TABLE 3.

As mentioned above, a rubber composition for a tire, in which workability and abrasion resistance are more highly balanced, can be obtained by using a polybutadiene having predetermined properties.

INDUSTRIAL APPLICABILITY

Since a rubber composition for a tire according to the present invention has improved workability and abrasion resistance, it can be used for tire members such as treads, side walls, and chafers.

What is claimed is:

1. A rubber composition for a tire, comprising:
a polybutadiene (i) which has:
(A) a Mooney viscosity ($ML_{1+4,100°C.}$) being 43 to 70;
(B) a ratio ($Tcp/ML_{1+4,100°C.}$) of 5 wt % toluene solution viscosity (Tcp) to Mooney viscosity ($ML_{1+4,100°C.}$) being 0.9 to 1.7;
(C) a stress relaxation time (T80) being 10.0 to 40.0 seconds, which is a time until a torque is attenuated by 80% when the torque at the end of $ML_{1+4,100°C.}$ measurement is 100%; and
(D) a molecular weight distribution (Mw/Mn) being 2.50 to 4.00;
a second rubber (ii); and
a rubber reinforcing material (iii).

2. The rubber composition for a tire according to claim 1, wherein 1 to 100 parts by weight of the rubber reinforcing material (iii) is compounded with respect to 100 parts by weight of the rubber component (i)+(ii) which consists of 5 to 90 parts by weight of the polybutadiene (i) and 95 to 10 parts by weight of the second rubber (ii).

3. The rubber composition for a tire according to claim 1, wherein the polybutadiene (i) further has:
(E) a weight average molecular weight (Mw) being $40.0 \times 10^4$ to $75.0 \times 10^4$, and
(F) a ratio of cis-structure to cis-structure, trans-structure and vinyl-structure in microstructural analysis being 98 mol % or less.

4. The rubber composition for a tire according to claim 1, wherein the polybutadiene (i) is produced by using a cobalt catalyst.

5. The rubber composition for a tire according to claim 1, comprising a styrene butadiene rubber as the second rubber (ii).

6. The rubber composition for a tire according to claim 1, comprising a natural rubber or an isoprene rubber as the second rubber (ii).

7. The rubber composition for a tire according to claim 2, wherein the polybutadiene (i) further has:
(E) a weight average molecular weight (Mw) being $40.0 \times 10^4$ to $75.0 \times 10^4$, and
(F) a ratio of cis-structure to cis-structure, trans-structure and vinyl-structure in microstructural analysis being 98 mol % or less.

8. The rubber composition for a tire according to claim 2, wherein the polybutadiene (i) is produced by using a cobalt catalyst.

9. The rubber composition for a tire according to claim 3, wherein the polybutadiene (i) is produced by using a cobalt catalyst.

10. The rubber composition for a tire according to claim 2, comprising a styrene butadiene rubber as the second rubber (ii).

11. The rubber composition for a tire according to claim 3, comprising a styrene butadiene rubber as the second rubber (ii).

12. The rubber composition for a tire according to claim 4, comprising a styrene butadiene rubber as the second rubber (ii).

13. The rubber composition for a tire according to claim 2, comprising a natural rubber or an isoprene rubber as the second rubber (ii).

14. The rubber composition for a tire according to claim 3, comprising a natural rubber or an isoprene rubber as the second rubber (ii).

15. The rubber composition for a tire according to claim 4, comprising a natural rubber or an isoprene rubber as the second rubber (ii).

16. The rubber composition for a tire according to claim 5, comprising a natural rubber or an isoprene rubber as the second rubber (ii).

* * * * *